Dec. 13, 1949  G. C. KLINGEL  2,490,817
IMMERSION THERMOCOUPLE
Filed March 10, 1945
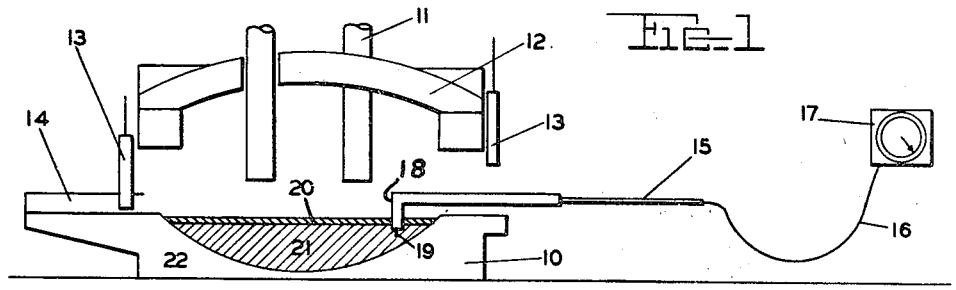
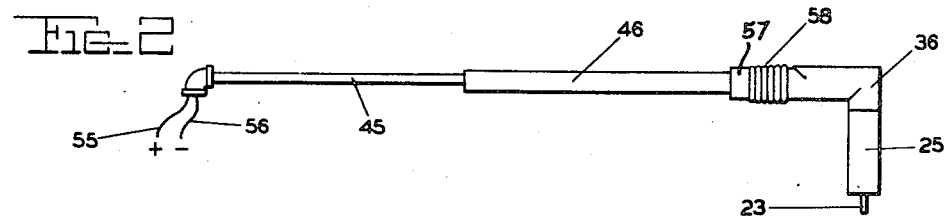
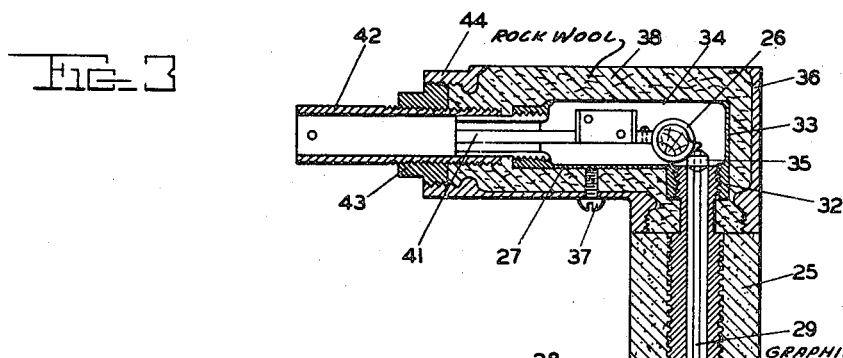
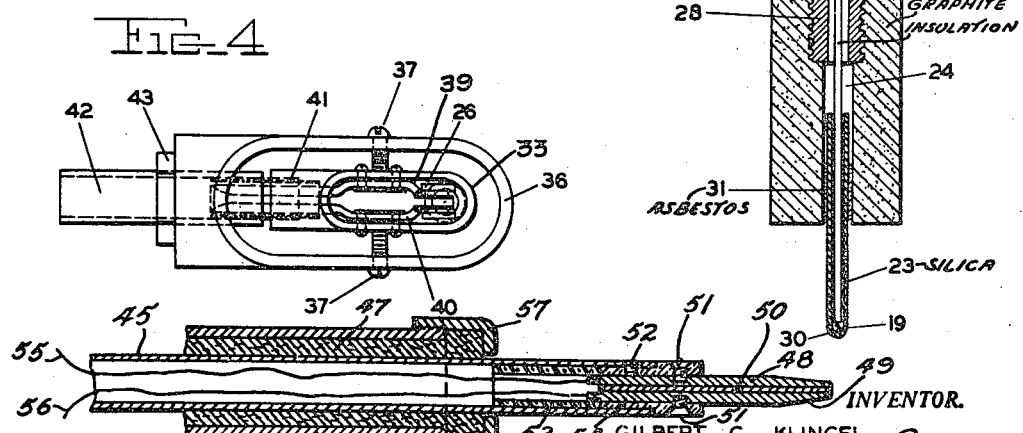
INVENTOR.
GILBERT G. KLINGEL
BY
HIS ATTORNEY Patented Dec. 13, 1949

2,490,817

UNITED STATES PATENT OFFICE 2,490,817

IMMERSION THERMOCOUPLE

Gilbert C. Klingel, Randallstown, Md., assignor, by mesne assignments, to Armco Steel Corporation, a corporation of Ohio Application March 10, 1945, Serial No. 582,116

3 Claims. (Cl. 136—4)

My invention relates to temperature measurements, and more particularly concerns a new thermocouple unit and method of measuring the temperature of molten steel or other metals.

An object of my invention is to provide a technique and method of measuring the temperature of molten steel or other metal while in the melting furnace whereby extremely accurate and sensitive temperature measurements at notably high temperatures can be achieved in ready and speedy manner with but a minimum of manipulation and skilled supervision.

Another object is to provide a new thermocouple unit which provides for rapid and highly accurate temperature measurements at extremely elevated values, which while simple, both in constructiton and operation, and of comparatively low first cost, at the same time is compact, unitary and self-contained, is readily subject to quick and convenient servicing, re-calibration, and conditioning for repeated use, and which servicing can be effectively carried into execution as a routine matter after short training by operators of merely average skill.

A further object is to provide a thermocouple unit incorporating the various features of advantage set forth in the preceding paragraph and in which fresh thermocouple wire can be presented at the working tip from time to time, at the will of the operator, and in which parts subject to wear or attack by the high temperatures, chemical constituents of the regions undergoing measurement, etc., can be replaced readily, and which thermocouple unit can be entirely dismantled for servicing in ready and speedy manner.

Other objects will in part be obvious and in part pointed out hereinafter.

My invention accordingly resides in the several combinations of elements, features of construction, and arrangement of parts, together with the several operational steps, and in the combination of any one of the same with one or more of the others, all as described herein, and the scope of the application of all of which is indicated in the claims following at the end of this specification.

In the drawings, wherein I have indicated solely by way of illustration, and not in any sense to be construed as limitative, several views of one embodiment of my invention which I prefer at present, and wherein like reference characters denote like parts throughout the several views.

Figure 1 constitutes a view, partly in elevation and partly in section, illustrating the board application of my invention.

Figure 2 is a side elevation showing the immersion thermocouple unit in its entirety.

Figure 3 is a vertical section, and Figure 4 a top plan view of the head portion of the thermocouple.

Figure 5 is a fragmentary longitudinal section through the working end of thermocouple handle, coupling with the thermocouple head for operation.

The fundamental simplicity of my invention can best be understood having reference to the disclosure of Figure 1. Therein I indicate the conventional electric arc furnace at 10 with electrodes 11 movably extending through roof 12. Vertically slidable doors 13, 13 at the front and back of the door permit access to the furance, the tapping spout being shown at 14 at the left in Figure 1. The thermocouple unit, indicated generally at 15, is connected by cable 16 to remote metering device 17, this ensemble comprising a direct-acting electrical pyrometer potentiometer. I find it advisable, in certain instances, to protect the recording instrument 17 from excessive heat and dust by mounting it in a sheet-iron box lined with asbestos board. The head, indicated generally at 18 (Figure 1), of the thermocouple 15, so extends, when in operable position, through the door 13 opposite spout 14 that the tip 19 thereof extends through the slag line 20 to an appreciable distance below the surface of the molten metal 21. I indicate the bank or hearth of the furnace at 22. Preferably the head 18 is protected from the intense heat of the furnace by a coating of fire clay or other refractory, this preventing undue scaling and measurably increasing its life.

Considerable improvement is resident in the constructional details of the immersion-type platinum thermocouple which I have evolved and adapted from the general type of equipment heretofore developed in England by Schofield and Grace, see for example J. Iron and Steel Inst., vol. 145 (1942), pages 223P through 234P. The various details of this thermocouple are disclosed in Figures 3 and 4 and will be discussed at a later point herein.

My choice of a platinum immersion thermocouple was prompted by its basic simplicity of design and maintenance. I desire it particularly to be noted, however, that I am not restricted to a platinum thermocouple. In point of fact certain inherent disadvantages are resident in the platinum thermocouple. Among them may be noted that for all practical purposes its upper range is limited to about 3200° F. Moreover, casual thought might indicate that the use of platinum thermocouples is too expensive for use in a melt shop and its construction somewhat fragile. Experience demonstrates, however, that no practical significance attaches to the fragility and expense of such equipment.

Referring to Figures 1, 2 and 3, it may be noted that the wire elements of the thermocouple from which the tip 19 is formed are what I conveniently term a platinum-platinum 13% rhodium thermocouple conveniently formed of 0.020 inch diameter wire. This thermocouple is protected by a fused silica tube 23 which is removably mounted in the central bore 24 of a block of graphite 25. This graphite extension block can conveniently be machined, for example, from a section of scrap furnace electrode.

For reasons which will be developed I desire to provide a substantial excess of electrocouple wire from which the working tip can be renewed from time to time. To accomplish this I provide a storage spool 26 provided within junction box 27 which likewise will be described in greater detail hereinafter. Conveniently for this purpose there is employed a hardwood spool or a ceramic spool formed in any suitable manner. It is of course entirely possible, however, to employ any convenient means of storing the required excess of wire, as by simply folding it in accordion-pleats and storing it in a contained reservoir therefor.

Graphite block 25 is of substantial thickness serving to protect its contained electrocouple wire from the contaminating and destructive effect of either heat or chemical action. A machined tube 28 in the present embodiment constructed of 18—8 chrome nickel steel is threaded into the central bore 24. Within bore 24 and extending through tube 28, which passes to approximately the end point of the length of bore 24, I provide a double bore insulator or tube 29. Conveniently I construct this of vitreous silica or sillimanite, although other refractory insulating material quite possibly could be used. One of the thermocouple wires extends through each bore of tube 29. This latter, passing through the entire block 25, projects appreciably beyond the lower edge of the latter and terminates about ½ inch short of the end of the tip 19 of the thermocouple to provide an effective and sensitive working head.

About the end of the thermocouple I slip the fused silica tube 23, approximately 5 inches long, closed at its outer end 30, and in intimate contact with the thermocouple tip 19 for good heat conductivity. Tube 23 illustratively has an outside diameter of about ½ inch with a wall thickness of about 2 millimeters. This tube extends about half way into bore 24 about insulator 29. The tube 23 is removable and its fit in bore 24 is loose. In any suitable manner, as by asbestos packing 31 rammed into place, I firmly secure tube 23 in position so that accurately determinable conditions surround each observation.

By means of the foregoing construction the thermocouple is effectively shielded against contamination by chemical action, either in the form of gases, or solids. This is highly important, for chemical attack would be extremely energetic at the elevated temperatures prevailing in furnace practice. Moreover, the shielding action of block 25, double bore tube 29, and silica tube 23 effectively safeguards against physical injury or even destruction of the thermocouple under thermal and energetic chemical action. As it is, the greatest impact of detrimental thermal and chemical attack is upon the replaceable silica tube 23.

The tube 28 extends beyond block 25 and is secured, as by threading 32, to an inner junction box 33. This junction box 33 is open at its upper face 34 and is intended to be closed normally by a cover plate, not shown. It is this inner junction box 33 which houses the spool 26 on suitable bearings of any sort, here shown as journal bearings. Tube 29 terminates at its inner end in an enlarged head 35 which seats on the tip of tube 28, thereby anchoring tube 29 in place.

Junction box 33 is floatingly mounted in an outer L-shaped junction box 36 of which block 25 comprises an extension, by any suitable means, here illustrated as comprising three set screws 37, 37, 37. Conveniently I construct junction box 33 of ¾ inch standard cast-iron pipe, such as is conventional in electrical wiring practice. Junction box 36 in my present embodiment is comprised of 2-inch standard cast-iron piping. I find it advisable to fill the space between the two junction boxes with rock-wool packing 38, or other suitable non-inflammable thermal insulator.

The thermocouple wires, one strand of which, as has been stated, is of platinum, and the other of 13% rhodium platinum, are wound around and maintained separate on spool 26 so that they will not contact each other. Within junction box 33 each thermocouple wire connects, beyond spool 26, with a copper contact element 39, 40. I contour and space these elements so that together they comprise a split jack or socket 41 which extends beyond the confines of junction box 33 but short of the limits of junction box 36. Socket 41 is made fast to junction box 33 in any suitable manner as by press fit, threading, soldering, welding, or the like. Similarly, it is made fast in suitable and convenient manner at the outer end to a guide tube 42. This guide tube extends exteriorly of junction box 36, threading through bushing 43, or being otherwise secured thereto. Bushing 43 closes the left end of junction box 36, being threaded thereinto at 44.

A handle, disclosed in Figures 2 and 5, complete the thermocouple unit. Handle 45 is used to manipulate the immersion head 18 (Figure 1) through the door of the furnace and to dip it into the bath. This handle 45, comprised of ¾ inch standard pipe, is encased in that portion thereof intended to extend into the furnace or other zone of elevated temperature in a section 46 of 2 inch standard pipe. The annular space between the two pipes I fill with rock-wool 47 or other suitable insulation. A copper jack, preferably of the same composition as the compensating lead wires, formed of two parts 48, 49, separated by insulation 50 is made fast within the right end of pipe 45 (Figure 5) by means such as set screws 51, 51 and 52. In the particular embodiment illustrated a sleeve 53 of insulation is first inserted snugly within pipe 45 until the inner end is adjacent the terminus of pipe 46. It is followed by stepped section 54 of insulation fiber, the inner, reduced throat of which is snugly recessed in pipe 45, being locked by set screw 52, and abutting section 53. Its outer end is of diameter substantially that of tube 45. Plug 48, 49 is received snugly in section 54, and is locked therein by flat-headed set screws 51, 51.

Compensating thermocouple lead wires 55, 56 extend from plug elements 48, 49 (Figure 5) through handle 45 to the electronic or other suitable potentiometer box 17 (Figure 1) which is permanently mounted near the arc furnace.

A cap 57 extends over pipe 45 and threads onto the outer end of pipe 46. The opening in cap 57 is of sufficient diameter to permit free expansion and contraction of pipe 45. That portion of pipe 45 which is exposed between cap 57 and the bushing 43 (Fig. 3) is wrapped with asbestos packing 58 (Figure 2).

Thus, in general, it may be said that my immersion pyrometer comprises a thermocouple of the type described protected by a fused silica tube 23 mounted in a block of graphite 25. In use, it is this exposed layer of silica which is immersed in the steel bath. The heavier graphite block not only is in contact with the molten metal, but over other portions of its extent, with the slag layer and the hot atmosphere of the furnace.

A noteworthy feature of my invention is that the immersion head, best depicted in Figures 3 and 4, may be readily disconnected from the long pipe handle 45. A definite advantage is thereby realized, since after each use the immersion head must be reconditioned. By providing for dismantling, I make it necessary only to carry the light-weight working head to the work shop for replacement of the silica protection tube 23 and for any repairs, calibration, and the like which may be required to condition the unit for the next reading.

While not in use the handles 45, relatively long and unwieldy, are stored in racks near the furnace. I construct the immersion heads so that they can be used interchangeably and connected to the handles at any furnace in the shop. It is for this reason that I provide a jack-plug electrical connection between the replaceable immersion head and the pipe handle 45.

Certain precautions, simple in themselves, should be observed in following the technique of my invention, in order to ensure uniform and rapid results. Before the thermocouple is installed, for example, I weld the wire ends into a thermocouple tip. I first anneal this tip and then calibrate it against a standard thermocouple. In use, and following every sixth reading, I observe the practice of clipping back one-quarter of an inch from the thermocouple tip. I then check the remaining wire for contamination, weld a new tip, anneal and recalibrate it. I find that following this practice each 30-inch length of thermocouple, uncoiled from spool 26 as it is consumed, may reasonably be expected to provide about 275 readings in service. Of course all discarded thermocouple tips should be saved for scrap.

A further precaution, very important to the successful practice of my invention, is that the welded thermocouple tip be closely adjacent to, and preferably in contact with, the bottom of the silica tube 23, and that at least ½ inch of the wire extends beyond the end of the double-bore tube 29. Should, for example, the tube 29 be carried too close to the welded tip, or should the tip not touch the outer silica tube 23, then the response of the thermocouple is much slower than is otherwise the case. In this connection I find the translucency of the fused silica tube 23 to be a great aid in setting the thermocouple tip 19.

The compactness of my new thermocouple head by no means precludes ready access thereto for inspection and repair. To this end it is necessary only to remove the cover plate (not shown) of junction box 36 and expose the cover plate (likewise not shown) of inner junction box 33 by removing some of the rock-wool packing. Thereupon, following removal of this inner covering, the thermocouple may be readily disconnected and easily lifted out of the unit for further servicing.

In practice I have found it expedient to store thermocouple handles, indicated generally at 45, in a rack near each furnace. For continuous operation of the equipment eight interchangeable immersion heads are usually required. They are rotated in their use so that three or four stand ready at all times, the others variously being repaired, inspected, or rebuilt. My experience demonstrates that one man, working forty-eight hours a week, can keep six furnaces supplied with immersion heads for use in measuring the temperature of every heat melted, even when the melting operations are continuous.

Among other important advantages resulting from the practice of my invention, I have found that contrary to what might be reasonably anticipated, it is unnecessary to cool artificially the thermocouple head in any way. No requirement exists of circulating air or water onto the top of the head. While this could easily be done, I find it entirely unnecessary for proper operation. To make certain that this is so, I experimented by building small thermocouples into an immersion head at various locations. I enclosed Tempilstiks in the inner junction box 35. I found that the temperature at the upper end of the platinum thermocouple did not exceed 150° F. after an immersion of one minute duration. It is true that some time lag is displayed, and that the temperature interiorly of the immersion head continues to rise for some time following removal from the bath, until following about eight minutes it may reach a value as high as 400° F. This is not detrimental, however, since a reading is always completed within a minute. The accuracy of my observations in this connection is confirmed by the absence of charring of the wooden spools 26. Accordingly, I have determined that air or water cooling is not required, and should be avoided for simplicity.

Since many embodiments of my invention will readily occur to those skilled in the art, once the broad idea thereof is disclosed my present disclosure is to be considered as merely illustrative, and not by way of limitation.

I claim:

1. A thermocouple head comprising in combination, a junction box having a removable cover, a second junction box mounted within said first junction box, thermal insulation retained as a filling between said junction boxes, a thermocouple partially housed within said second junction box and comprising a substantial quantity of thermocouple wire capable of being fed through said head as required, a centrally-bored graphite block, having a bored ceramic insulator therein through which said wire passes, fastened to said first junction box and protecting said wire against thermal and chemical attack, a portion of said wire extending beyond said insulator and having its ends joined together to form a working tip, and a ceramic tube closed at its outer end secured to said bored block and surrounding the end of said thermocouple tip.

2. A thermocouple head comprising in combination, a junction box having a removable cover, a second junction box mounted within said first junction box, thermal insulation retained as a filling between said junction boxes, a thermocouple partially housed in said second junction box comprising a substantial quantity of thermocouple wire capable of being fed through said head as required, a selected one of a jack and plug joint located in one end of said second junction box to which said thermocouple wire is connected, a block protective against thermal and chemical attack and having a central bore therein fastened to the other end of said first junction box, a bored ceramic insulator in said central bore of said block, a portion of said thermocouple wire extending through said insulator and having its ends joined together to form a working tip, and a ceramic tube closed at its outer end fitting in said bored block about said insulator and substantially in contact with the end of said thermocouple tip.

3. A thermocouple unit comprising in combination, a junction box having a removable cover, a second junction box mounted within said first junction box and having an element of a jack and plug therein, a handle having the cooperating elements of said jack and plug provided at one end thereof and connected with said second junction box, electrical leads extending through said handle and connected to said jack and plug element, thermal insulation retained as a filling between said junction boxes, a thermocouple partially housed within said second junction box and comprising a substantial quantity of thermocouple wire, a spool in said second junction box over which the wire is wound, a block protective against thermal and chemical attack having a central bore therein fastened to said first junction box, a bored ceramic insulator in said central bore of said block, a portion of said thermocouple wire extending through said insulator and having its ends joined together to form a working tip, and a ceramic tube closed at its outer end fitted in said bored block about said insulator and surrounding the end of said thermocouple tip.

GILBERT C. KLINGEL.

REFERENCES CITED

The following references are of record in the file of this patent:

UNITED STATES PATENTS

| Number | Name | Date |
|---|---|---|
| 1,054,442 | Nice | Feb. 25, 1913 |
| 1,377,274 | Porter | May 10, 1921 |
| 1,761,392 | Hase | June 3, 1930 |
| 1,808,507 | Poole | June 2, 1931 |
| 2,019,695 | Ross | Nov. 5, 1935 |
| 2,279,846 | Stapleton | Apr. 14, 1942 |
| 2,363,057 | Gaylord | Nov. 21, 1944 |
| 2,420,897 | Milton | May 20, 1947 |

FOREIGN PATENTS

| Number | Country | Date |
|---|---|---|
| 514,682 | Germany | Dec. 17, 1930 |

OTHER REFERENCES

Bosomworth: J. Ind. and Eng. Chem., vol. 33 (1941), p. 571.

Schofield, F. H.: J. Iron and Steel Inst., vol. 145 (1942), p. 227.

Schofield et al.: Iron and Steel Inst., Special Report No. 25, Eighth Report on the Heterogeneity of Steel Ingots, Section VII (1939), pages 241-244.

Sordahl et al.: Temperature Measurement and Control, Am. Inst. Physics (1941), pages 928-930, 937-945.

Oliver et al.: J. Iron and Steel Inst., vol. 145 (1942), pp. 247P, 254P, 255P.

Weitzenkorn, L. F.: Electric Furnace Steel, Proc. 2nd. Conference A. I. M. E. (1944), pages 143-149.

Trans. A. I. M. E., vol. 120 (1936), pages 207, 208.